United States Patent
Elliott et al.

(10) Patent No.: US 9,992,317 B2
(45) Date of Patent: Jun. 5, 2018

(54) SYSTEM AND METHOD OF FACILITATING COMMUNICATION BETWEEN A MOBILE DEVICE AND VEHICLE COMPUTER SYSTEM

(71) Applicant: Ford Global Technologies, LLC, Dearborn, MI (US)

(72) Inventors: Doron M. Elliott, Detroit, MI (US); Sena Hermiz, Farmington Hills, MI (US); Florian Frischmuth, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 299 days.

(21) Appl. No.: 14/623,413

(22) Filed: Feb. 16, 2015

(65) Prior Publication Data
US 2016/0241695 A1    Aug. 18, 2016

(51) Int. Cl.
*H04M 1/00* (2006.01)
*H04M 1/60* (2006.01)

(52) U.S. Cl.
CPC ...... *H04M 1/6091* (2013.01); *H04M 2250/74* (2013.01)

(58) Field of Classification Search
CPC .................................................. H04M 1/6091
USPC ....... 455/569.2, 404.2, 411, 418, 447, 556.1, 455/456.4; 340/254, 347
See application file for complete search history.

(56) References Cited

U.S. PATENT DOCUMENTS

| | | | |
|---|---|---|---|
| 7,127,271 B1 * | 10/2006 | Fujisaki | H04M 1/271 455/550.1 |
| 7,451,085 B2 | 11/2008 | Rose et al. | |
| 7,826,945 B2 * | 11/2010 | Zhang | G06F 3/16 701/36 |
| 2006/0019613 A1 | 1/2006 | Lim | |
| 2007/0291383 A1 | 12/2007 | Watson et al. | |
| 2010/0097239 A1 | 4/2010 | Campbell et al. | |
| 2010/0191535 A1 | 7/2010 | Berry et al. | |
| 2011/0119062 A1 | 5/2011 | Dohan | |
| 2011/0313593 A1 | 12/2011 | Cohen et al. | |
| 2012/0214469 A1 | 8/2012 | Tadayon et al. | |
| 2012/0259951 A1 | 10/2012 | Schalk et al. | |
| 2012/0313768 A1 | 12/2012 | Campbell et al. | |
| 2013/0137415 A1 | 5/2013 | Takikawa | |
| 2013/0208135 A1 * | 8/2013 | Han | G06F 3/017 348/211.9 |

(Continued)

OTHER PUBLICATIONS

CNET, CES 2015, New Hyundai head unit for CES 2015 integrates Android, Iphones, http://www.cnet.com/news/hyundai-showing-android-auto-apple-carplay-integration-at-ces-2015/Dec. 2014.

*Primary Examiner* — Dhaval Patel
(74) *Attorney, Agent, or Firm* — Jennifer M. Stec; Brooks Kushman P.C.

(57) ABSTRACT

A vehicle computer system comprising a wireless transceiver configured to communicate with a mobile device. The vehicle computer system further includes a processor in communication with the wireless transceiver. The processor is configured to transmit a request to the mobile device to activate a voice recognition session of the mobile device, determine an inhibition status of the voice recognition session based feedback to the request, and transmit a resolution instruction relating to a inhibition status of the voice recognition session.

20 Claims, 4 Drawing Sheets

(56) References Cited

U.S. PATENT DOCUMENTS

2013/0325479 A1 12/2013 Krueger et al.
2014/0066132 A1 3/2014 Burke et al.
2014/0120892 A1 5/2014 Martin et al.

* cited by examiner

SYSTEM AND METHOD OF FACILITATING COMMUNICATION BETWEEN A MOBILE DEVICE AND VEHICLE COMPUTER SYSTEM

TECHNICAL FIELD

The present invention relates to a vehicle computer system's interaction with a mobile device as related to activating a mobile device's voice recognition system.

BACKGROUND

A vehicle computer system may include a telematics system that is capable of communicating with a mobile device. The vehicle computer system may utilize the mobile for various functions, such as audio functions, phone functions, navigation functions, and voice recognition functions.

The present invention relates to a vehicle computer system's interaction with a mobile device as related to activating a mobile device's voice recognition system. The vehicle computer system may utilize input and output components to facilitate in a voice recognition session utilizing a connected mobile phone. During certain scenarios, a voice recognition session of the mobile device may be inoperable or lack certain operation through utilization of the input and output components of the vehicle computer system.

SUMMARY

A first illustrative embodiment discloses a vehicle computer system comprising a wireless transceiver configured to communicate with a mobile device. The vehicle computer system further includes a processor in communication with the wireless transceiver. The processor is configured to transmit a request to the mobile device to activate a voice recognition session of the mobile device, determine an inhibition status of the voice recognition session based feedback to the request, and transmit a resolution instruction relating to a inhibition status of the voice recognition session.

A second illustrative embodiment discloses a method comprising transmitting a request to a mobile device via a wireless transceiver to activate a voice recognition session of the mobile device. The method further includes determining an inhibition status of the voice recognition session based on feedback to the request and transmitting a resolution instruction relating to the inhibition status of the voice recognition session.

A third illustrative embodiment discloses a mobile device comprising a wireless transceiver configured to communicate with a vehicle computer system and a processor in communication with the wireless transceiver. The processor of the mobile device is configured to receive a request from the vehicle computer system to activate a voice recognition (VR) session of the mobile device, wherein the VR session utilizes input and output components of the vehicle computer system. The processor is further configured to transmit feedback regarding an inhibition status of the VR session to the vehicle computer system and receive a resolution instruction relating to the inhibition status.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

Figure 1:
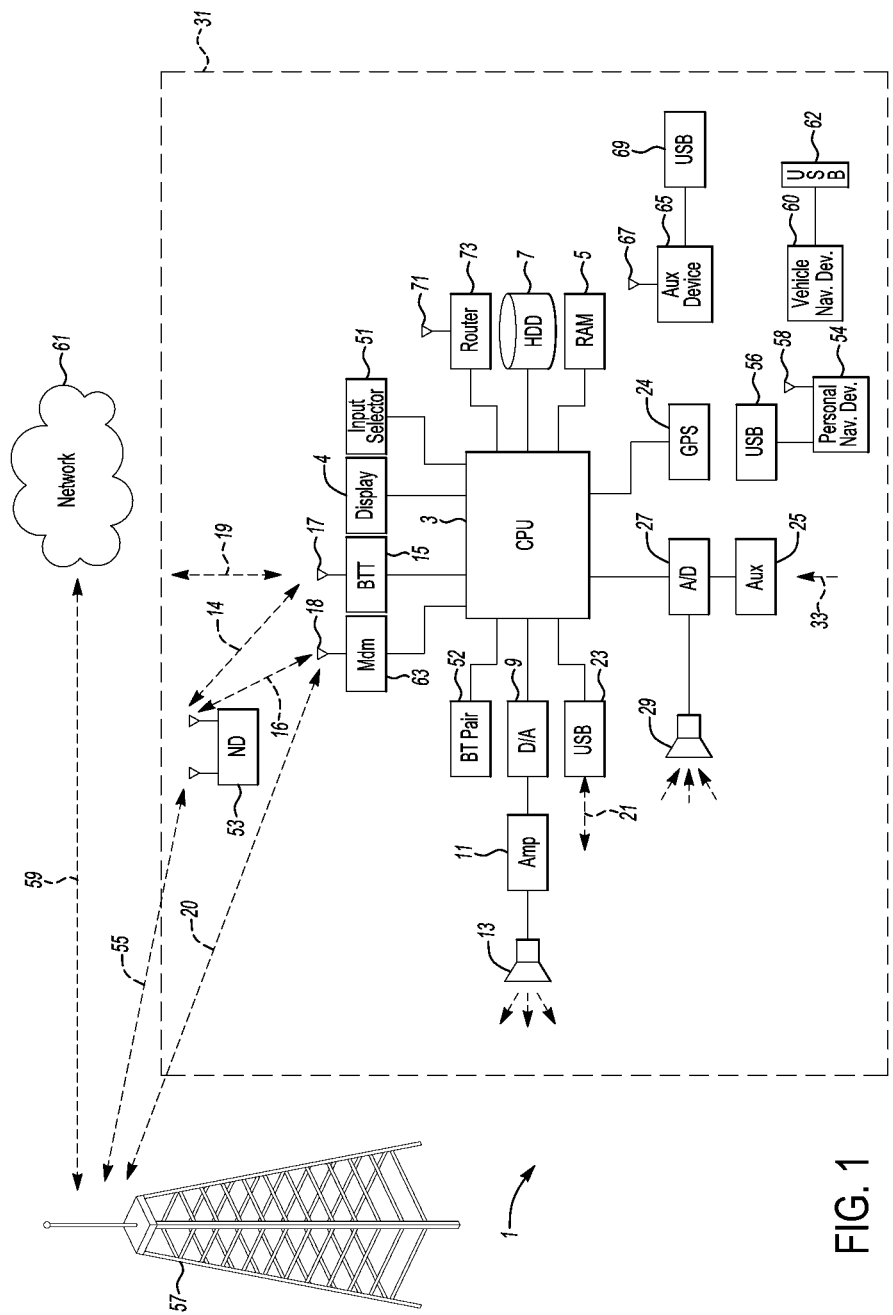
FIG. 1 illustrates an example block topology for a vehicle based computing system (VCS) for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to select between various inputs. Input to both the microphone and the auxiliary connector is converted from analog to digital by a converter 27 before being passed to the processor. Although not shown, these and other components may be in communication with the VCS over a vehicle multiplex network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, tablet, a device having wireless remote network connectivity, etc.). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, nomadic device, key fob and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
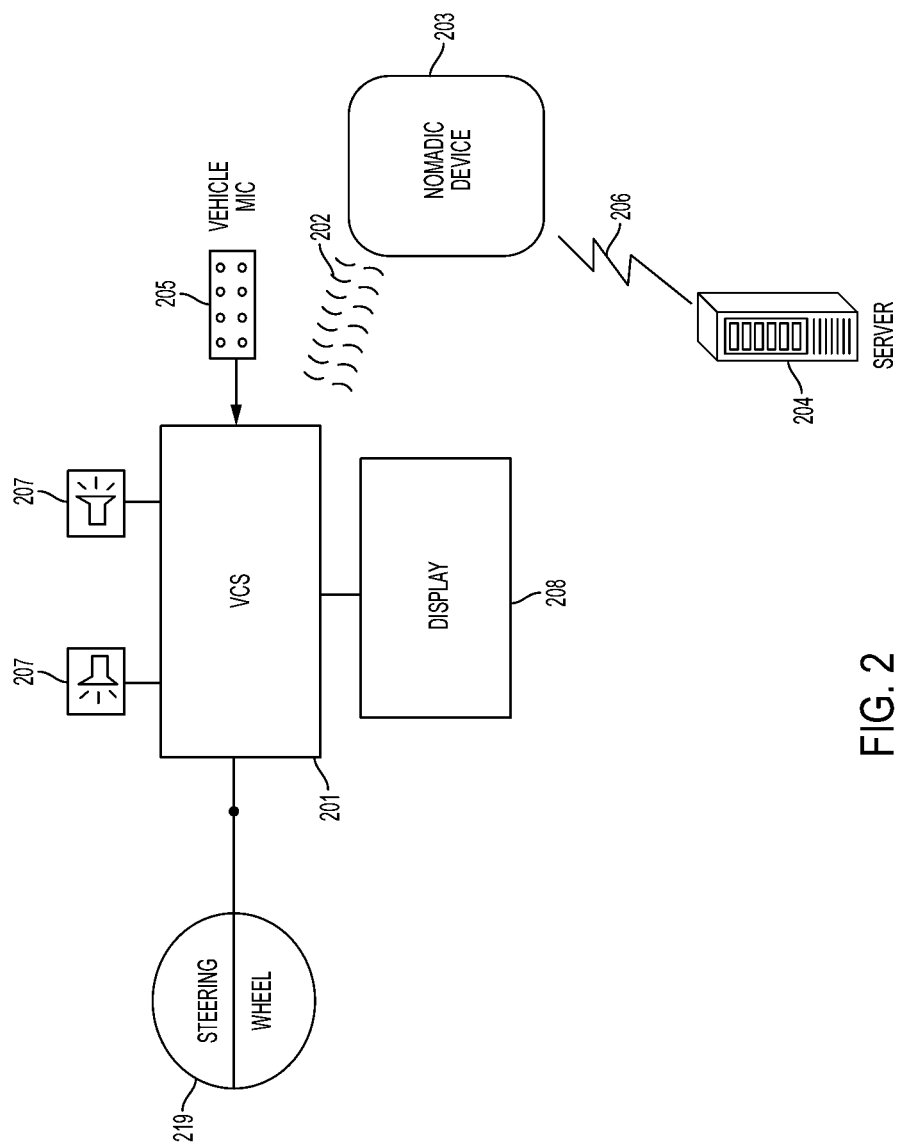
FIG. 2 illustrates an example block topology of a vehicle based computing system utilizing a wireless module to communicate with a nomadic device.

FIG. 2 illustrates an example block topology of a vehicle based computing system utilizing a wireless module to communicate with a nomadic device. A nomadic device 203 may be in communication with a VCS 201 and a vehicle interface module (not shown). The nomadic device may be in wired or wireless communication with both the VCS 201 or vehicle interface module (not shown) to help facilitate the VCS 201 in communication with the nomadic device. In the illustrative embodiment of FIG. 2, the nomadic device 203 communicates with the VCS 201 via Bluetooth. Although the VCS may communicate data through wireless signals 202 to the nomadic device via a variety of Bluetooth profiles (i.e. HFP, A2DP, AVRCP, GAP, HID, etc), FIG. 2 shows an example utilizing the hands free profile. Additionally, the vehicle interface module may be capable of communicating data through wireless signals to the nomadic device via the human interface device profile, although any of the variety of Bluetooth profiles may also be accessible.

The VCS 201 may also use a vehicle microphone 205 for receiving voice input commands from a user. The voice input may be used in conjunction with a voice recognition system located on the VCS, the nomadic device, or on a remote network. The VCS may retrieve a voice recognition system via the remote network utilizing the nomadic device. The remote voice recognition may be retrieved utilizing the nomadic device's wireless transceiver (e.g. GSM, 3G, 4G, LTE, Wi-Fi, Wi-Max, etc). Upon the nomadic device retrieving the voice recognition system, the nomadic device may be able to send the voice recognition prompts or commands to the VCS via the wireless signal 202. The voice recognition prompts, as well as other output retrieved from the nomadic device or a remote server in communication with the nomadic device or VCS, may be output via the vehicle speakers 207 or other output device (e.g. vehicle display 208, instrument cluster, etc). Additionally, the VCS may receive voice commands from the vehicle MIC 205 to send to the nomadic device or remote voice server via the wireless signal 202. The vehicle speakers 207 and vehicle display 208 may be utilized to output a notification related to an error or inhibition related to activating the voice recognition session. The inhibition may include information regarding a disrupt or failure of activating the voice recognition session, or may related to a partial interruption or failure of only an aspect of the voice recognition session. A notification may be played via the speakers or output on a display to help facilitate a user in error recovery or to facilitate in resolving the inhibition.

The VCS may determine when an activation signal is initiated for the nomadic device. For example, the processor may determine that a press and hold of the PTT button should initiate a voice request session on the nomadic device. Upon a user pressing and holding the PTT skip button, the portable vehicle interface module may send a signal to the nomadic device mimicking a nomadic device's "HOME" button activate a voice recognition session. Although this embodiment activates a voice recognition session, the processor may be used to mimic any interaction with the nomadic device via the HID profile. Thus, any application or function of the nomadic device may be utilized, not only a voice recognition session. For example, a third party application may be activated on the nomadic device utilize the vehicle interface module. Different vehicles may be able to utilize different activation signals to operate or launch applications on the nomadic device. In another embodiment, a Bluetooth profile may be utilized to activate the voice recognition system on the mobile phone and open a Bluetooth communication channel for utilizing the VCS with the mobile phone's voice recognition system.

The processor may contain software to translate specific types of vehicle input to operate a function on any nomadic device. The processor of the VCS may send one type of specific message during that vehicle's use of an input controller or input (i.e. press and hold a PTT button, double-tap a PTT button, single press a PTT button), while input device may be utilized to send a different type of message for the nomadic device.

In one embodiment, the voice recognition system may be initiated by utilizing a button on the steering wheel 219, or any other input device located in the vehicle (e.g. touch screen, hard-button, keyboard, haptic device, rotary knob, etc.). Upon activating a push to talk switch on the steering wheel 219, the input controller may send a message. The vehicle may be able to utilize different activation signals for different phones or other different types of nomadic devices.

The input controller 219 may be capable of sending different commands to the vehicle interface module based on input method that may be defined by the user, microcontroller, vehicle manufacturer, phone manufacturer, etc. For example, a single press of the PTT button may initiate the voice recognition system of the VCS to be activated. However, the interface module may be configured in a manner that a press and hold may initiate the voice recognition of the nomadic device, or the voice recognition of the remote network or server 204 in communication with the nomadic device. Additional input variations may be included, such as a triple-press, a double press and hold, a double tap, or any other combination to distinctly activate the different voice recognition systems of the VCS, nomadic device, and remote voice server in communication with the nomadic device, etc. The VCS may also include its own distinct input device to activate the mobile phone's VR system, including a button on the touch screen input, a dedicated PTT button on the steering wheel for only the mobile device, a hard button, a voice recognition command utilizing the VR system of the VCS, etc.

Additionally, an alternative embodiment may include an internal keyboard (e.g. built into the steering-wheel, the keyboard used on the multimedia display, etc.) or external keyboard that may be utilized as an input controller. The keyboard may communicate with the vehicle or nomadic device utilizing a wired or wireless communication. The keyboard may be capable of initiating a voice request on the nomadic device 203 or the remote voice server in communication with the nomadic device. Additionally, the keyboard of the VCS 201 may be capable of sending additional input signals to the nomadic device to send operation data to the nomadic device 203. For example, a user may utilize the keyboard to type a text message, enter an address, operate the nomadic device's user interface, etc. The operation data may facilitate any error handling. Thus, a touch screen display of the VCS may be able to operate on a nomadic device as an input controller seamlessly. For example, the vehicle interface module may be capable of utilizing the input of the VCS to control the nomadic device. The nomadic device may be able to send interface data (e.g. the device's HMI or GUI) to the vehicle for output on the display. The user may then utilize inputs of the vehicle to control the nomadic device by sending commands through the vehicle interface module.

In another embodiment, the VCS may be utilized to send commands to devices in remote locations. The VCS may operate a remote device by utilizing the data connection of the nomadic device to send commands to the remote device. For example, appliances in a home may be in communication with an off-board server. A driver may be able to initiate a function or operate the home appliance by sending a signal from the VCS via the nomadic device. From the nomadic device, the signal may be sent to a remote server that is in communication with the appliance.

The mobile device may work in conjunction with the remote server 204 for facilitation of the voice recognition session. For example, the mobile device 203 may utilize the remote server 204 for processing of certain voice commands. Data and information may be communicated through wireless signal 206. The wireless signal may communicate input/output to and from the VCS as well. For example, the input of spoken speech commands received from the vehicle mic 205 may be sent to the remote server 204 via the wireless signal 206. Additionally, output data, voice prompts, directions/navigation signals, and other data may be sent to the VCS 201 from the remote server 204 via the wireless signals 206 utilizing the nomadic device 203.

In alternative embodiments, vehicle computer system may also retrieve software or firmware updates from the remote server. The vehicle computer system may include its own independent transceiver to communicate with the remote server, or utilize another module or the nomadic device to communicate with the remote server. The software or firmware updates may be utilized to update Bluetooth profiles, vehicle data bus translation, or other functionality to help facilitate communication with the nomadic device. For example, a software update to the VCS may be utilized to facilitate the activation of a nomadic device voice recognition session.

In another embodiment, the VCS may be in communication with a vehicle interface module (not shown) that is plugged into the vehicle's on-board diagnostics (OBDII) port. The OBDII port may retrieve vehicle messages from the vehicle data bus. Although the vehicle interface module may be plugged into the OBDII port in the illustrative embodiment of the vehicle, the vehicle interface module may communicate with the vehicle bus via a serial port, USB transceiver, BT transceiver, or other interface. Further, the vehicle interface module may be portable or embedded in the vehicle. The vehicle's data bus may utilize standards such as CAN (Controller Area Network), MOST (Media oriented Systems Transport), or other bus protocol. The input controller 219 signal may initiate the vehicle interface module to begin activation of the nomadic device's voice recognition system based on the configuration of the microcontroller. Additionally, the input controller may also be capable of sending a signal to the VCS to begin detection via the vehicle MIC 205 for a voice command.

The vehicle interface module may include a controller area network (CAN) support module, or another similar node on the vehicle bus network to retrieve diagnostic commands, messages, or other data from a vehicle's data bus. A microcontroller of the vehicle interface module may be utilized to aid in processing data retrieved from the CAN support module and a wireless module. The wireless module may be a Bluetooth module, or any other short-range communication module (either wired or wireless), such as a Wi-Fi transceiver, Wi-Max, USB, HDMI, RFID, etc. Additionally, the Bluetooth module and microcontroller may communicate amongst one another via a USB to UART connection. The Bluetooth module may be used to communicate with the nomadic device 203 via wireless signals. The wireless signals may communicate utilizing the human interface device profile.

The portable vehicle interface module may be device independent as well. Thus, the microcontroller may be configured to send a specific command to the device based on the type of device (e.g. brand, model, software version, etc) and a different command for another device. For example, the portable vehicle interface module may mimic the press and hold of the home button to initiate voice recognition of one nomadic device. While interfacing with another nomadic device, the microcontroller may send a different command to instead mimic the nomadic device's interface by activating a double tap of the device's home button to initiate a voice recognition session. The portable vehicle interface module may determine which commands to send to the nomadic device to activate a specific feature that a user of the vehicle is requesting. The microcontroller may understand which messages to send to the nomadic device by utilizing Bluetooth (e.g.—the HID profile) or another type of protocol, API, software, etc.

Figure 3:
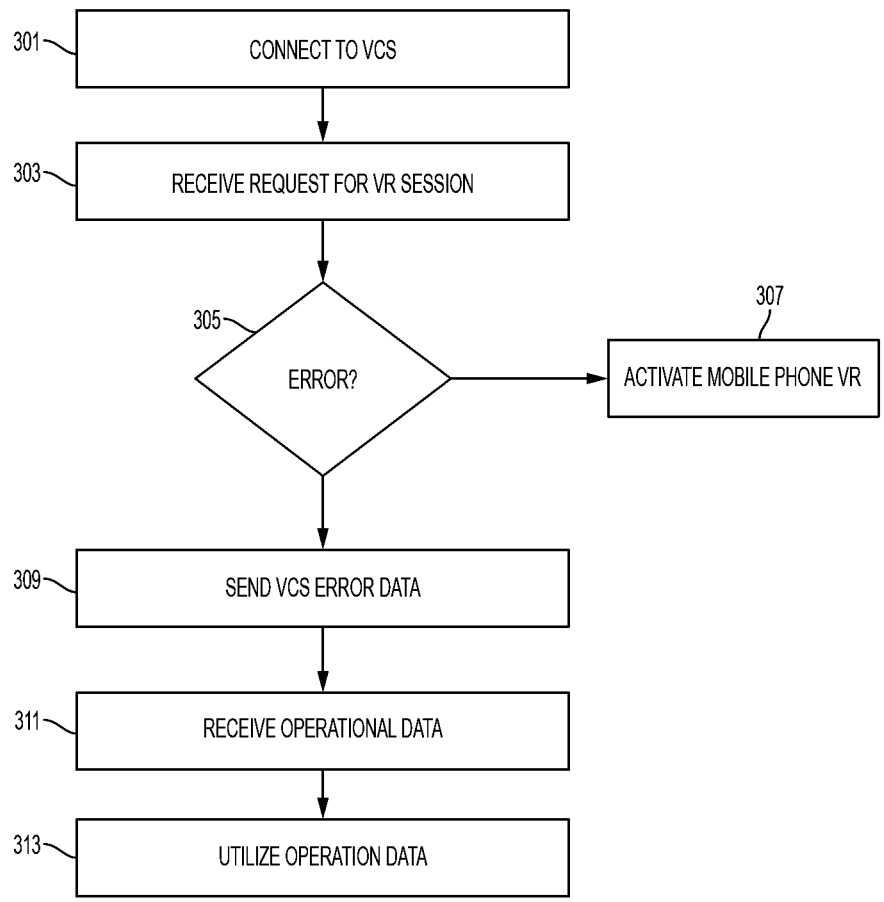
FIG. 3 is an exemplary flow chart of the vehicle computer system's operation during communication with a nomadic device.

FIG. 3 is an exemplary flow chart of the vehicle computer system's operation during communication with a nomadic device. The VCS may connect to the nomadic device 301 via a transceiver (e.g. wireless or wired). In one embodiment, the VCS may connect to the nomadic device utilizing Bluetooth communication. The VCS may communicate with the nomadic device to operate a number of functions, including audio, phone, navigation, and voice recognition features.

Upon connecting and communicating with the nomadic device, the VCS may send a request to activate a voice recognition session on the nomadic device 303. The voice recognition system may be initiated by a unique button press or dedicate input part of the vehicle or vehicle computer system. For example, while a press of the push-to-talk (PTT) switch on the vehicle steering wheel may activate a voice recognition session embedded on the VCS, a double-tap of the PTT or push and hold of the PTT switch may activate a voice recognition session of the nomadic device. The VCS may leverage and utilize various components, such as the vehicle mic, speaker, and display, to facilitate a voice recognition session of the nomadic device when both the nomadic device and VCS are in communication. For example, the mobile device VR session may output voice prompts via vehicle speakers, receive input commands via the vehicle mic, and output voice guidance text and prompts via a vehicle display (multimedia system, instrument cluster, heads up display, etc).

The mobile phone may then determine if an error has occurred 305 when attempting to initiate a VR session at the mobile device. The mobile phone or VCS may offer several methods of determining if an error has occurred. In one embodiment, the VCS may have a timeout active to indicate that an error has occurred upon receiving an unusual response or no response from the mobile device after a threshold time. For example, if the VCS attempts to initiate a VR session of the mobile device and no communication occurs between the VCS and mobile device for two seconds (although any amount of time may suffice), the VCS may determine that an error has occurred. In another embodiment, the VCS may receive data from the mobile phone indicating a reason why the error has occurred. The mobile device may send the error on its own, or may also request additional data form the mobile phone when determining the situation to facilitate the VR session between the VCS and mobile device. If no error occurs, the VCS or mobile phone may successfully activate the VR session of the mobile device 307 utilizing the input/outputs of the VCS to facilitate a VR session in the driving environment.

Upon determining an error has occurred, the mobile phone may send the error data to the VCS 309. The error data may include information indicating why the mobile phone could not activate the VR session. Such error data may include information about the status of the mobile phone. For example, if the mobile phone's VR session requires an internet connection, the mobile phone may send information to the VCS indicating that no connection exists, and therefore, the VR session could not be activated. In another example, the mobile phone may not activate the VR session upon the phone being locked. The mobile phone may send information to the VCS indicating the phone is unlocked. In yet another embodiment, the mobile phone may be able to determine the error and resolve the error by itself, without the VCS facilitating the error-handling.

The VCS may send various data to the mobile device to facilitate error handling. In one embodiment, the mobile phone may receive operational data 311 to resolve an error. The operation data include specific commands or data to mimic phone operation. For example, the operation data may include a command to unlock the phone. An API may be utilized to facilitate the exchange of commands between the VCS and mobile phone to utilize the operation data. Additionally, the mobile phone may utilize a Bluetooth profile to receive/utilize the operation data. In one embodiment, the Bluetooth profile HID profile to receive data to mimic the operation on the mobile phone.

Upon receiving the operation data, the mobile device may utilize the operation data 313. The operation data may be utilized to mimic the operation of the mobile phone and to activate the VR session. In one embodiment, the operation data may be utilized to mimic operation by unlocking a screen or the mobile phone. In another embodiment, the operation data may be utilized to access or turn on Wi-Fi. The utilization of the operation data may be utilized to enable or disable any number of features on the mobile phone. If the operation data is successful utilized, the mobile device may update the status of the mobile phone or resolve the error to activate a mobile phone's VR engine utilizing the VCS.

Figure 4:
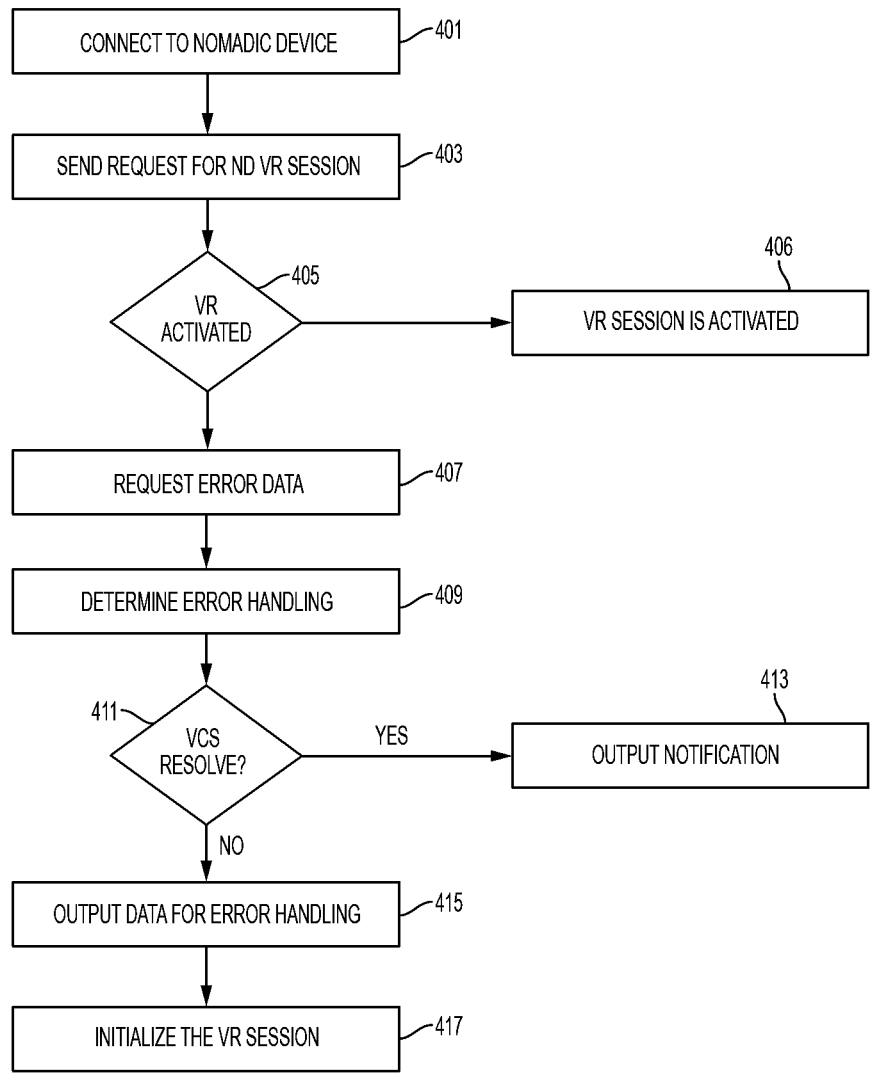
FIG. 4 is an exemplary embodiment of the vehicle computer system interacting with a nomadic device to utilize a voice recognition session.

FIG. 4 is an exemplary embodiment of the vehicle computer system interacting with a nomadic device to utilize a voice recognition session. The VCS may connect with a nomadic device 401 utilizing a wireless transceiver, such as a Bluetooth transceiver. The VCS may also be equipped other hardware to communicate with a nomadic device, such as a USB port or another hard-wired transceiver. Additionally, the VCS may be capable of operating with an aftermarket module that communicates with the vehicle (e.g. Bluetooth, USB, wired, OBDII port, etc) to facilitate in communicating with a mobile device.

Upon connecting to the mobile device, the VCS may send a request to the nomadic device to activate a VR session 403. The request may be sent wirelessly or wired. Additionally, the request may be sent utilizing a Bluetooth profile or an API to facilitate communication between the VCS and the mobile device. For example, the VCS may utilize the HID profile to mimic and press and hold of a mobile phone's HOME button to activate the mobile phone's VR system.

The VCS may determine if the VR session is activated 405. The VCS may determine whether the VR session is activated utilizing a number of methods. In one embodiment, the VCS may have a timeout active to indicate that an error has occurred upon receiving an unusual response or no response from the mobile device after a threshold time. In another embodiment, the VR session may wait to receive input data from a user, and if no user input is received after a threshold time, the VCS may determine an error has occurred. In another embodiment, the VCS may receive data from the mobile phone indicating a reason why the error has occurred. However, if no error occurs and the VR session on the mobile device is activated, the VCS may work in conjunction with the mobile phone to leverage the input/output devices of the vehicle to facilitate a VR session.

If the VCS determine that the VR session is not activated, the VCS may also request error data from the mobile device 407. The VCS may send a message that requests information from the mobile device that may include various parameters indicating software states of the VCS. The message may also request specific status data from mobile phone. For example, the VCS may request the mobile phone to send information about the lock/unlock status, internet connection status, program/application running status, privacy status, Bluetooth profile information (e.g. version, profile support, etc), and other information.

The VCS may determine how to resolve the error 409 and activate the VR session upon receiving the requested data. A look-up table or algorithm may indicate how to handle various types of errors. For example, if the phone is locked, the VCS may understand that the mobile phone needs to be unlocked to resolve the error. The error handling of the VCS may also be utilized to determine if the VCS can resolve the error 411, or determine if customer input is required.

If customer input is required to resolve the error, the VCS may output a notification 413 to notify the customer of the error. A message may be broadcast to a user of the vehicle indicating an error has occurred. In another example, the message may tell the user how to resolve the error. The notification may be output on vehicle speakers, a heads-up display, an instrument cluster display, notification to the mobile phone, or other means. Additionally, a generic notification simply indicating an error has occurred may be output.

If the VCS may be able to resolve the error with minimum or no input from the customer, the VCS may attempt to resolve the issue. The VCS may attempt to output a message or error-handling data 415 to the mobile phone to resolve any issues. The error-handling data may also utilize the Bluetooth HID profile to mimic operation of the phone. In one example, the VCS may be capable of unlocking the phone in order to activate the VR session via the VCS. In another example, the VCS may send data to the mobile phone indicating to power-on the internet (e.g. cellular connection or WiFi) to activate the VR session. Upon successfully handling the error, the VCS may then initialize the VR session 417 for utilizing in conjunction with the VCS.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system comprising:
   a wireless transceiver configured to communicate with a mobile device;

a processor in communication with the wireless transceiver, configured to:
(i) transmit a voice recognition (VR) request to the mobile device to activate a voice recognition session of the mobile device;
(ii) determine an error status of the VR session based on feedback from the mobile device related to the VR request not capable of activating the VR session of the mobile phone based upon an error on the mobile device;
(iii) output a resolution instruction relating to the error status of the VR session.

2. The vehicle computer system of claim 1, wherein the resolution instruction includes an operation instruction for operating the mobile device.

3. The vehicle computer system of claim 1, wherein the error status includes an indication that operation of the mobile device is locked.

4. The vehicle computer system of claim 3, wherein the resolution instruction includes an operation instruction for unlocking operation of the mobile device.

5. The vehicle computer system of claim 4, wherein the processor is further configured to transmit the operation instruction for unlocking the mobile device via a human interface device profile using the wireless transceiver.

6. The vehicle computer system of claim 1, wherein the vehicle computer system further includes a vehicle display and the processor is further configured to output the resolution instruction to the vehicle display.

7. The vehicle system of claim 1, wherein the vehicle computer system further includes a vehicle speaker and the processor is further configured to output the resolution instruction to the vehicle speaker.

8. The vehicle computer system of claim 1, wherein the feedback is a response or a lack of response to the request.

9. The vehicle computer system of claim 1, wherein the VR session utilizes input and output components of the vehicle computer system.

10. A method, comprising:
connecting with a mobile device via a wireless transceiver;
transmitting a voice recognition (VR) request to the mobile device to activate a voice recognition session of the mobile device;
determining an error status of the VR session based on feedback from the mobile device related to the VR request not capable of activating the VR session of the mobile phone based upon an error on the mobile device; and
outputting a resolution instruction relating to the error status of the VR session.

11. The method of claim 10, wherein the resolution instruction includes an operation instruction for unlocking the mobile device.

12. The method of claim 10, wherein the method further includes outputting the resolution instruction to a vehicle display.

13. The method of claim 10, wherein the method further includes outputting the resolution instruction to a vehicle speaker.

14. The method of claim 10, wherein the resolution instructions includes an operation instruction for operating the mobile device.

15. A mobile device comprising:
a processor in the mobile device configured to, in response to receiving a voice recognition (VR) request from a vehicle computer system to activate a VR session on the mobile device,
transmit feedback regarding an error status indicating the VR request not being capable of activating the VR session due to a mobile device error; and
output a resolution instruction to the vehicle computer system relating to the error status.

16. The mobile device of claim 15, wherein the feedback includes a response or a lack of response to the VCS.

17. The mobile device of claim 15, wherein the resolution instruction includes an operation instruction for operating the mobile device.

18. The mobile device of claim 17, wherein the processor is further configured to:
(i) utilize the operation instruction for operating a function of the mobile device as related to the mobile device error; and
(iii) activate the VR session upon executing instructions to operate the function.

19. The mobile device of claim 15, wherein the resolution instruction is received from the vehicle computer system via a human interface device profile.

20. The mobile device of claim 15, wherein the processor is further configured to determine an inhibition status of the VR session.

* * * * *